United States Patent
Krier et al.

(10) Patent No.: US 8,578,990 B2
(45) Date of Patent: Nov. 12, 2013

(54) LOW ASPECT RATIO SUPER SINGLE TRUCK TIRE

(75) Inventors: Roland Willibrord Krier, Wasserbillig (LU); Francois Pierre Georges, Stavelot (BE); Jean-Michael Alphonse Fernand Gillard, Arlon (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 240 days.

(21) Appl. No.: 13/038,525

(22) Filed: Mar. 2, 2011

(65) Prior Publication Data

US 2012/0222792 A1 Sep. 6, 2012

(51) Int. Cl.
- *B60C 9/18* (2006.01)
- *B60C 9/20* (2006.01)
- *B60C 9/22* (2006.01)

(52) U.S. Cl.
USPC ............ 152/535; 152/526; 152/531; 152/532

(58) Field of Classification Search
USPC .......................... 152/526–527, 530–532, 535
IPC ........................................ B60C 9/18, 9/20, 9/22
See application file for complete search history.

(56) References Cited

U.S. PATENT DOCUMENTS

| | | | | |
|---|---|---|---|---|
| 3,516,468 A | * | 6/1970 | Jones | 152/528 |
| 5,591,284 A | * | 1/1997 | Gaudin | 152/532 |
| 6,145,560 A | * | 11/2000 | Yamada et al. | 152/532 |
| 6,401,778 B1 | | 6/2002 | Cluzel | |
| 2005/0126674 A1 | | 6/2005 | Hardy et al. | |

FOREIGN PATENT DOCUMENTS

| | | | |
|---|---|---|---|
| FR | 2827221 | | 1/2003 |
| JP | 59077906 A | * | 5/1984 |
| JP | 05069702 | * | 3/1993 |
| JP | 2002211207 A | * | 7/2002 |

OTHER PUBLICATIONS

Machine Translation: JP05-069702; Takahira, Koji; (No Date).*
Machine Translation: JP2002-211207; Takagi, Hajime; (No Date).*

\* cited by examiner

*Primary Examiner* — Justin Fischer
*Assistant Examiner* — Kendra Shin
(74) *Attorney, Agent, or Firm* — David L King

(57) ABSTRACT

A pneumatic low aspect ratio truck has a crown reinforcing structure 7. The crown reinforcing structure 7 has a first steel belt ply 9 between the at least one carcass ply 3 and the tread 5, a second steel belt ply 11 between the first belt ply 9 and the tread 5, a third steel belt ply 13 between the second steel belt ply 11 and the tread 5 and a fourth steel belt ply 15 between the third steel belt ply 13 and the tread 5. The crown reinforcing structure 7 additionally has at least one circumferential steel strip 17 between the second and the third belt plies 11, 13.

7 Claims, 2 Drawing Sheets

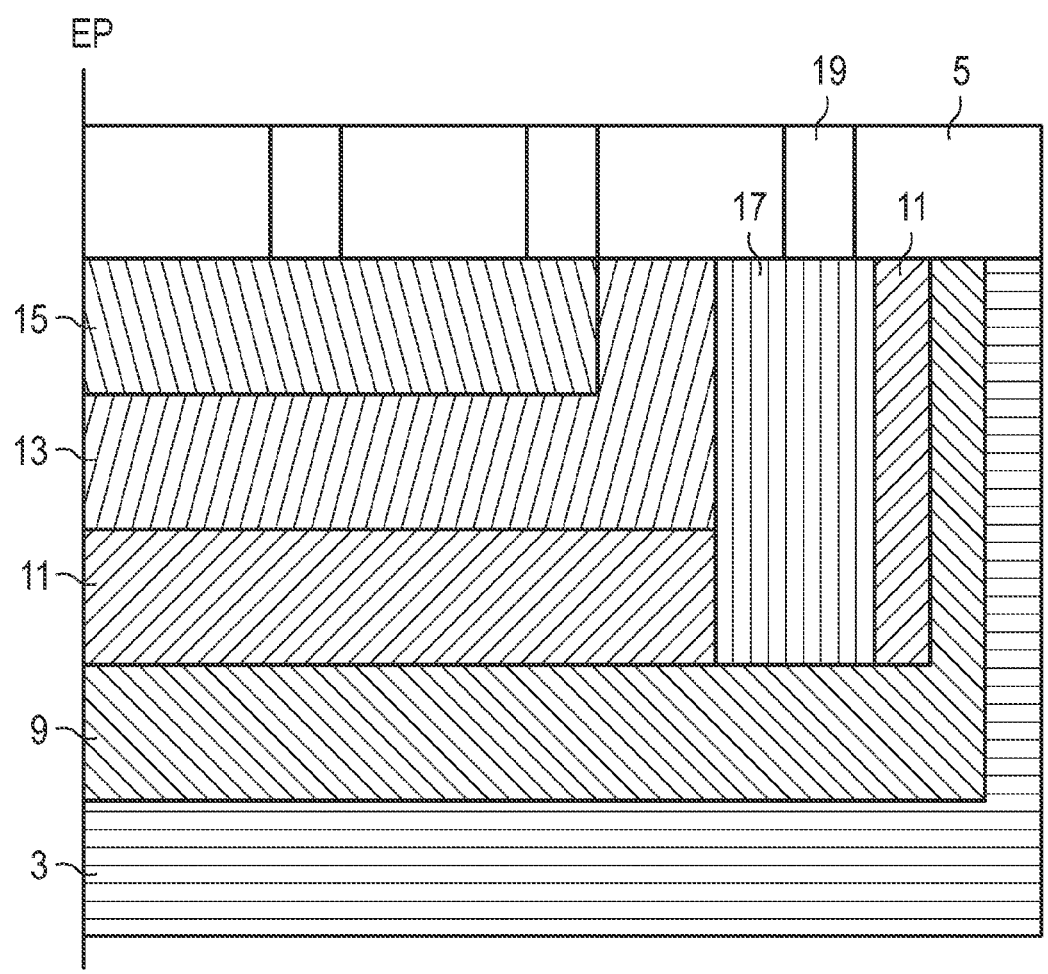

LOW ASPECT RATIO SUPER SINGLE TRUCK TIRE

FIELD OF THE INVENTION

The present patent application is directed to a pneumatic tire, in particular a wide base low aspect ratio tire for trucks.

BACKGROUND OF THE INVENTION

Super single tires, which are wide base low aspect ratio truck tires replacing two small base tires, so-called dual mounted tires, have been used for years on trailers. Such tires are usually of size 385/65R22.5 or 385/55R22.5 and have a maximum load-carrying capacity of 4.5 metric tons.

Over the years these wide base tires appeared more and more on trucks in the steering position because they had an expected higher mileage.

Recently it became of interest to use also super single tires in the drive positions.

Tires in the drive position have to bear part of the trailer load and must have an increased load capacity. Tire standards define a load capacity of 5.8 metric tons and a maximum speed of 110 km/h. These tires have very low aspect ratios and are usually of size 495/45R22.5. Drive tires are exposed to harsh service conditions and conventional constructions show crown area durability problems. Furthermore, the pressure distribution through the elastomeric blocks in the footprint lacks the required uniformity.

US 2005/0126674 A1 discloses a pneumatic truck tire, in particular a super single radial truck tire. The tire comprises a crown reinforcing structure including a single helically wound belt ply reinforced with high elongation steel cords. In one embodiment of this publication, the tire comprises four belts on top of two steel strips. The strips are located between the carcass ply and the radially inner helically wound ply. Although the tire disclosed in this publication might constitute an improvement with regard to earlier prior art, room for further improvements remains. In practice, respective tires may show groove cracking at the intermediate shoulder groove and/or might exhibit breaker edge separation between the two outer breakers. Furthermore, an increased wear of the shoulders may be observed.

U.S. Pat. No. 6,401,778 B1 discloses another pneumatic truck tire having a radial carcass reinforcement and two working crown plies of inextensible reinforcing elements. An additional ply essentially parallel to the circumferential direction of the tire is positioned between the two working plies. Both working plies extend axially beyond the axial width of the additional ply and are coupled with each other over an axial length of at least 16% of the maximum axial with of the carcass reinforcement. This tire design may also provide an improvement with regard to earlier truck tires. However, durability could still be improved.

SUMMARY OF THE INVENTION

In view of the prior art, it is an object of the present invention to provide a pneumatic tire, in particular, a super single radial truck tire having a crown reinforcement resulting in improved durability and/or efficiency.

A further object of the present invention may be a better distribution of strain energy and/or stresses generated during the tire's service in the shoulder area of the belt plies comprised in the tire's crown.

Yet another object of the present invention is to reduce heat generation in the shoulder area of the tire or at the edge of the crown or belt plies during operation of the tire.

Still another object of the invention is to improve the footprint shape of the tire.

Still another object of the invention is to relief working belts from strains or stresses in general.

In accordance with an embodiment of the invention a pneumatic tire comprises at least one pair of parallel annular beads, at least one carcass ply wrapped around said beads, a tread, first and second sidewalls disposed between said tread and one of said at least one pair of beads, and a crown reinforcing structure disposed between said at least one carcass ply and said tread in a crown area of said tire. The crown reinforcing structure further comprises a first belt ply between the at least one carcass ply and a second belt ply, the first belt ply and the second belt ply comprising steel reinforcing elements forming essentially opposite angles relative to the equatorial plane of the tire, the first and the second belt plies forming a first pair of adjacent working belts; as well as a third belt ply and a fourth belt ply between the second belt ply and the tread, the third and the fourth belt plies comprising steel reinforcing elements forming essentially opposite angles relative to the equatorial plane of the tire, wherein the third and the fourth belt ply form a second pair of adjacent working belts. Finally, the crown reinforcing structure comprises at least one (reinforcement) steel strip provided essentially in a circumferential direction between the second and the third belt plies and essentially radially underneath the shoulder groove location.

In contrast to the above described prior art tires, the present invention uses two pairs of working plies instead of only one pair of working belt plies covered by a protection belt and having a transition belt between the carcass ply and the pair of working plies. In combination with the steel strip between both pairs of working belt plies in accordance with the present invention, the footprint shape of the tire is improved and stress/strain is significantly reduced. Heat generation during operation of the tire in the shoulder area of the tire is reduced as well. Thus, the durability of the tire is improved.

In one aspect of the invention, the axial width of the steel strip is comprised between 5% and 25%, or preferably between 15% and 20% of the half tread width. In particular, these axial extensions of the steel strip proved to be advantageous.

According to another aspect of the invention the steel strip comprises a plurality of essentially parallel steel wires having an angle comprised between 0° and 4°, preferably between 0° and 1°, and even more preferably of about 0° with respect to the equatorial plane of the tire. Due to angles close to zero both pairs of working belts are particularly relieved from stresses improving the durability of the tire significantly.

In accordance with still another aspect of the invention, the strip is spirally applied and/or has an overall axial width comprised between 40 mm and 70 mm, preferably between 50 mm and 60 mm. Particularly, these axial widths result in good strain distribution properties and allow for an easy and efficient application of the strip.

In accordance with still another aspect of the invention, the angle between the first and the second belt plies is larger than the angle between the third and the fourth belt plies. In particular, this design results in an advanced stability and stress/strain distribution in the crown area of the tire.

In accordance with yet another aspect of the invention, the strip is wound around the second belt ply at least 1 time, preferably essentially 3 or 4 times. This feature can improve the stability of the crown area of the tire, in particular of the shoulder portion, and involves easy and efficient manner of application.

In accordance with yet another aspect of the invention, the first belt ply has a Right orientation, the second belt ply has a Left orientation, the third belt ply has also a Left orientation, and the fourth belt ply has a Right orientation with respect to the equatorial plane of the tire. This RLLR arrangement of crossed working belt plies has proved to be advantageous in investigations of the applicant. Strain energy can be well distributed during operation of the tire. Durability is improved.

According to another aspect of the invention, the axial width of the first belt ply is larger than the axial width of the second belt ply, the axial with of the second belt ply is larger than the axial width of the third belt ply, and the axial width of the third belt ply is larger than the axial width of the fourth belt ply. This arrangement provides for good stability. In particular, a good support of the shoulder can be obtained by an axially extra large first belt.

According to still another aspect of the invention, the first and the second belt plies have essentially opposite angles comprised between 30° and 35° with respect to the equatorial plane of the tire, and the third and the fourth belt plies have essentially opposite angles comprised between 16° and 25°, preferably comprised between 16 and 21°, with respect to the equatorial plane of the tire. In particular, in combination with the above described orientation of the steel strip these angles have been found to be advantageous for improving the tire's durability.

In yet another aspect of the invention, the tire may be a low aspect ratio truck tire, or preferably a super single drive truck tire, preferably having a 495/45 R 22.5 size.

In accordance with still another aspect of the invention, the tire comprises at least one wedge between the axial ends of the first and second belt plies and between the axial ends of the third and fourth belt plies. These wedges in combination with the steel strip have proved to be of particular advantage in relieving the shoulder area of stress and/or strain.

In accordance with another aspect of the invention, the crown reinforcement comprises two of the above mentioned steel strips, each of the two strips being provided essentially in a circumferential direction between the second and the third belt plies and essentially radially underneath each of the two shoulder groove locations of the tire.

In another aspect of the invention, a gum strip is added between the second belt ply and the third belt ply. This additional feature can further reduce strain energy between the axial edges of both belt plies.

It is remarked that the above mentioned features or different aspects of the invention may be combined with each other providing further advantageous designs of the tire in accordance with the present invention.

DEFINITIONS

As used herein and in the claims,

"Aspect ratio" refers to the ratio of the tire's section height to its section width;

"Axial" and "axially" refer to directions which are parallel to the axis of rotation of a tire;

"Radial" and "radially" refer to directions that are perpendicular to the axis of rotation of a tire;

"Bead" refers to that part of a tire comprising an annular tensile member, the bead core, wrapped by ply cords and shaped, with or without other reinforcement elements to fit a designed tire rim;

"Belt" or "belt ply" refers to an annular layer or ply of parallel cords, woven or unwoven, underlying the tread, not anchored to the bead, and having cord angles of from 0° to 80° with respect to the EP of the tire;

"Carcass" refers to the tire structure apart from the belt structure, tread, undertread, and sidewall rubber but including the beads, (carcass plies are wrapped around the beads);

"Circumferential" refers to lines or directions extending along the perimeter of the surface of the annular tread perpendicular to the axial direction;

"Cord" refers to one or more of the reinforcement elements, comprising one or more filaments/wires which may or may not be twisted or otherwise formed, which may further include strands which strands may also be formed, of which the plies in a product are comprised;

"Crown" refers to substantially the outer circumference of a tire where the tread is disposed;

"Equatorial plane (EP)" refers to a plane that is perpendicular to the axis of rotation of a tire and passes through the center of the tire's tread;

"Footprint" refers to the contact patch or area of contact of the tire tread with a flat surface at zero speed and under normal load and pressure or under specified load, pressure and speed conditions;

"Ply" refers to a continuous layer of rubber coated parallel cords;

"Super single tire" refers to a tire which replaces dual mounted tires on a specific axle; they are low aspect ratio tires and have a section width exceeding the section width of one of the previously dual mounted tires but inferior to the dual assembly width; and "Tread width (TW)" refers to the arc length of the tread surface in the axial direction, that is, in a plane passing through the axis of rotation of the tire.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIG. 2 schematically illustrates a plan view of a portion of the crown reinforcing structure according to the embodiment shown in FIG. 1. FIG. 2 should not be understood as limiting.

DETAILED DESCRIPTION OF THE INVENTION

Figure 1:
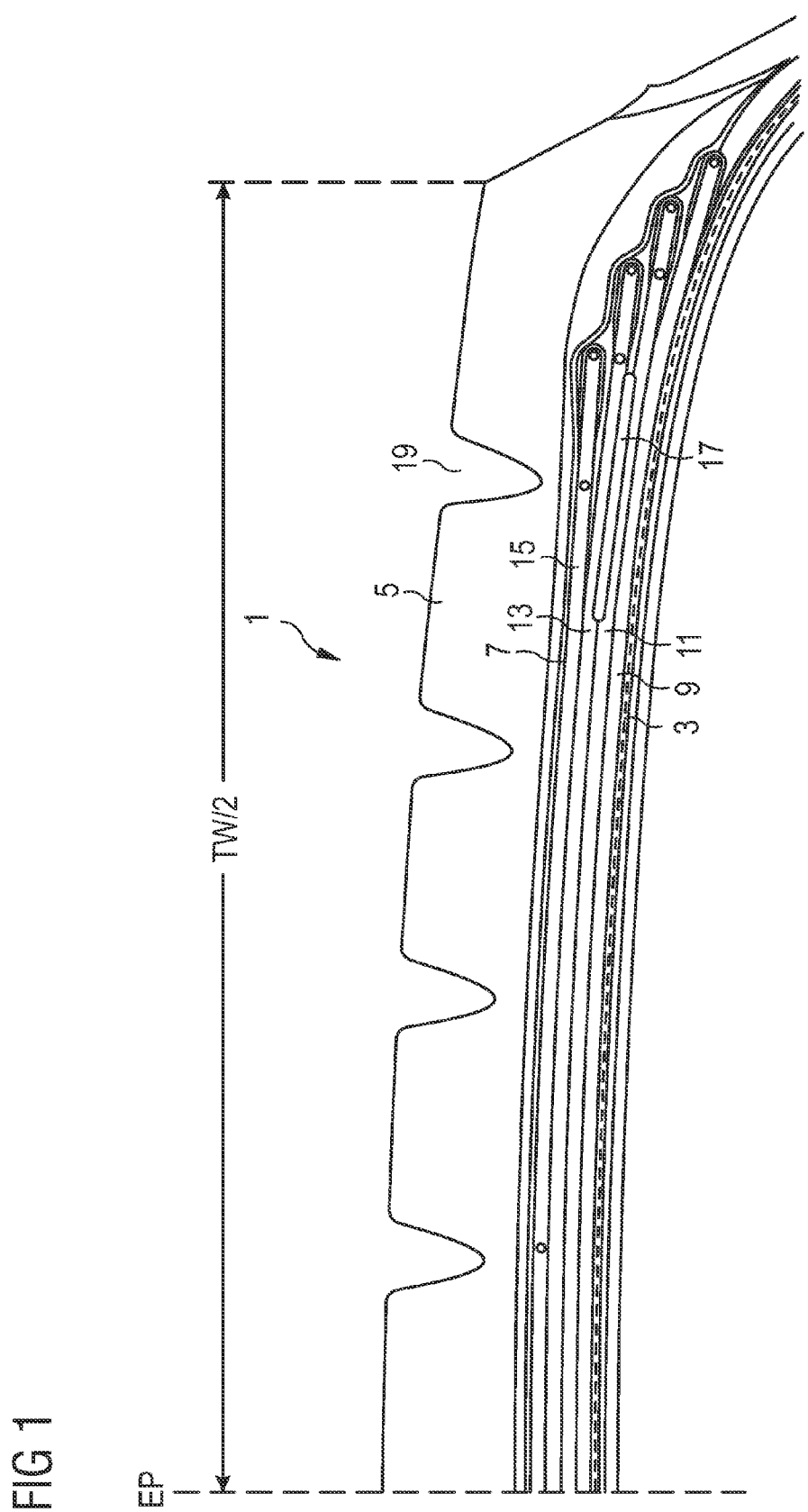
FIG. 1 is a cross-sectional view of a tire's crown according to an embodiment of the invention.

The following language is of the best presently contemplated mode or modes of carrying out the invention. This description is made for the purpose of illustrating the general principles of the invention and should not be taken in a limiting sense. The scope of the invention is best determined by reference to the appended claims. The reference numerals as depicted in the drawings are the same as those referred to in the specification.

With reference to FIG. 1, a preferred embodiment of the invention is shown. The depicted tire 1 comprises four belt plies 9, 11, 13, 15 radially above a carcass ply 3 extending from bead to bead of the tire (not shown). On the left hand side of FIG. 1 the equatorial plane EP of the tire 1 is shown. The tread 5 having an axial width TW is arranged above the four belt plies 9, 11, 13, 15.

In more detail, the tire 1 has a crown reinforcing structure 7 comprising a first belt ply 9, a second belt ply 11, a third belt ply 13, and a fourth belt ply 15. All four belt plies may comprise reinforcing material, e.g. steel strips. The first and the second belt plies 9, 11 have essentially opposite angles, preferably with an angle comprised between 30° and 35° with respect to the equatorial plane EP. Thus, the first and the second belt plies 9, 11 form a pair of (adjacent) working belts, or in other words, form a first working belt package. Preferably, the third and the fourth belt plies 13, 15 have opposite angles comprised between 16° and 21° with respect to the equatorial plane EP of the tire 1. Thus, the third belt ply 13 and the fourth belt ply 15 form (adjacent) working belts or in other words a second working belt package.

Preferably, the direction of orientation of the four belt plies is Right (R), Left (L), Left (L), Right (R) with respect to the equatorial plane EP. However, it would also be possible to provide a tire 1 with a Left, Right, Right, Left orientation of the four belt plies.

Furthermore, the embodiment of FIG. 1 features a steel strip 17 which is provided essentially radially below the shoulder groove 19 of the tire 1 and is further arranged between the second and the third belt plies 11, 13. Of course, the tire may comprise two steel strips 17 at each axial side of the tire 1. Both steel strips may be equally spaced from the equatorial plane EP of the tire 1.

The axial width of the steel strip 17 in an axial direction is preferably less than 25% of the half tread width TW/2. In a preferred embodiment this width is at least 10% of the half tread width TW/2, or preferably at least 15% of the half tread width TW/2 but less than 20% of the half tread width TW/2. Moreover, the strip can be spirally applied to the second belt ply 11, essentially in a circumferential direction of the tire 1. The strip can be wrapped essentially one time around the second belt ply 11, preferably with an overlap in the circumferential direction. The steel strip 17 may also be spirally applied to the second belt ply 11 of the tire 1 by wrapping the strip 17 two to four times around the tire.

Preferably, the (overall) width of the applied strip 17 may be comprised between 40 mm to 70 mm, or more preferably between 50 mm and 60 mm.

Preferably, the steel strip's direction of orientation is about 0° with respect to the equatorial plane EP of the tire 1. However, the angle of orientation could be comprised between 0° and 4°.

In general, the angle between the first and the second belt plies 9, 11 may be larger than the angle between the third and the fourth belt plies 13, 15.

As also shown in FIG. 1, the width of the belt plies 9, 11, 13, 15 decreases from the first belt ply to the fourth belt ply. Preferably, each belt ply is between 2% to 7% shorter than the radially preceding inner belt ply. Alternatively, each belt ply is about 1 cm to 2 cm shorter than the radially preceding inner belt ply.

Without limitation of the invention the belt plies 9, 11, 13, 15 may comprise a steel wire 4+3×0.41. With advantage the steel wire has an EPI of 10 to 12, preferably an EPI of 11. The steel strip 17 could comprise 4×7×0.26 steel wire. Preferably, steel wire comprised in the steel strip 17 has an EPI comprised between 9 and 11, preferably of 10. Although the described steel reinforcement may be of particular interest, other reinforcements could be used.

Optionally, rubber wedges may be provided between the axial edges of the working belt plies for the sake of a better strain transfer.

FIG. 2 shows a plan view of a portion of the crown reinforcing structure according to the embodiment shown in FIG. 1. The carcass ply 3 is covered by the first belt ply 9 which is covered by the second belt ply 11. The opposite hatching illustrates the working principle of both belt plies 9, 11. The second pair of working belt plies 13, 15 is illustrated as well with an opposite hatching. A steel strip 17 with a 0° angle is depicted between belt plies 11 and 13. Furthermore, a portion of the tread 5 including a shoulder groove 19 can be observed. FIG. 2 has basically been added for the sake of a better comprehensibility and should not be taken as limiting.

The invention has been described with reference to a best mode. Obviously, modifications and alterations will occur to others upon reading and understanding of this specification. It is intended to include all such modifications and alterations in so far as they come within the scope of the appended claims or the equivalents thereof.

The invention claimed is:

1. A low aspect ratio radial drive truck pneumatic tire comprising:
    at least one pair of parallel annular beads;
    at least one carcass ply wrapped around said beads;
    a tread, the tread having a pair of shoulder grooves, one shoulder groove in each location of the shoulder portion of the tire tread;
    first and second sidewalls disposed between said tread and one of said at least one pair of beads, and
    a crown reinforcing structure disposed between said at least one carcass ply and said tread in a crown area of said tire, wherein said crown reinforcing structure comprises:
    a first belt ply between the at least one carcass ply and the tread;
    a second belt ply between the first belt ply and the tread, the first and the second belt plies comprising steel reinforcing elements forming essentially opposite angles relative to the equatorial plane of the tire such that the first and the second belt plies form a first pair of adjacent working belts;
    a third belt ply between the second belt ply and the tread;
    a fourth belt ply between the third belt ply and the tread, the third and the fourth belt plies comprising steel reinforcing elements forming essentially opposite angles relative to the equatorial plane of the tire such that the third and the fourth belt plies form a second pair of adjacent working belts;
    wherein the first belt ply has a Right orientation, the second belt ply has a Left orientation, the third belt ply has a Left orientation, and the fourth belt ply has a Right orientation with respect to the equatorial plane of the tire, or wherein the first belt ply has a Left orientation, the second belt ply a Right orientation, the third belt ply has a Right orientation, and the fourth a Left orientation and wherein the angle between the first and the second belt plies is larger than the angle between the third and the fourth belt plies wherein the first and the second belt plies have essentially opposite angles between 30° and 35° with respect to the equatorial plane of the tire and wherein the third and the fourth belt plies have essentially opposite angles between 16° and 25° with respect to the equatorial plane of the tire; and
    at least one steel strip provided essentially in a circumferential direction between the second and the third belt plies and essentially radially underneath the shoulder groove location.

2. The tire according to claim 1, wherein the axial width of the at least one steel strip is comprised between 5% and 25%, or preferably between 15% and 20% of the half tread width.

3. The tire according to claim 1, wherein the at least one steel strip comprises a plurality of essentially parallel steel wires having an angle comprised between 0° and 4°, preferably between 0° and 1°, and even more preferably of 0° with respect to the equatorial plane of the tire.

4. The tire according to claim 1, wherein the at least one steel strip is spirally applied and/or has an axial width comprised between 40 mm and 70 mm, or even more preferably between 50 mm and 60 mm.

5. The tire according to claim 1, wherein the strip is wound around the second belt ply at least 1 time, preferably essentially 3 or 4 times.

6. The tire according to claim 1, wherein the axial width of the first belt ply is larger than the axial width of the second belt ply, the axial width of the second belt ply is larger than the axial width of the third belt ply, and the axial width of the third belt ply is larger than the axial width of the fourth belt ply.

7. The tire according to claim 1 comprising at least one wedge between the axial ends of the first and second belt plies and between the axial ends of the third and fourth belt plies.

* * * * *